(12) United States Patent
Liu et al.

(10) Patent No.: US 12,430,081 B1
(45) Date of Patent: Sep. 30, 2025

(54) LOG-BASED BLOCK CACHE DE-STAGE AND BACKEND STORAGE

(71) Applicant: MICROSOFT TECHNOLOGY LICENSING, LLC, Redmond, WA (US)

(72) Inventors: Zhihao Liu, Shanghai (CN); Xigeng Sun, Shanghai (CN); Yingrui Tong, Shanghai (CN); Sijia Huang, Shanghai (CN); Yuxing Zhou, Shanghai (CN); Junxiang Wang, Shanghai (CN); Vadim Makhervaks, Bellevue, WA (US); Bangzhu Zhu, Shanghai (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/744,555

(22) Filed: Jun. 14, 2024

(51) Int. Cl.
*G06F 12/00* (2006.01)
*G06F 3/06* (2006.01)

(52) U.S. Cl.
CPC .......... *G06F 3/0659* (2013.01); *G06F 3/0604* (2013.01); *G06F 3/065* (2013.01); *G06F 3/067* (2013.01)

(58) Field of Classification Search
CPC ...... G06F 3/0659; G06F 3/0604; G06F 3/065; G06F 3/067
USPC .......................................................... 711/154
See application file for complete search history.

(56) References Cited

U.S. PATENT DOCUMENTS

| | | | |
|---|---|---|---|
| 7,328,226 B1* | 2/2008 | Karr | G06F 11/1458 |
| 11,366,801 B1* | 6/2022 | Kumar | G06F 11/3419 |
| 2016/0041902 A1* | 2/2016 | Atkisson | G06F 12/0246 |
| | | | 711/103 |
| 2023/0333775 A1* | 10/2023 | Jain | G06F 3/0679 |

* cited by examiner

*Primary Examiner* — Mardochee Chery
(74) *Attorney, Agent, or Firm* — Han Gim; Newport IP, LLC

(57) ABSTRACT

Requests for a write storage operation are stored in a ring buffer. The next available request is retrieved from the ring buffer. When the next available request comprises a write operation that overlaps in a logical address range with a previous request stored in the ring buffer, the next available request is suspended. The next available request and the previous request are merged to generate a single request that includes logical address ranges of the next available request and the previous request.

20 Claims, 15 Drawing Sheets

LOG-BASED BLOCK CACHE DE-STAGE AND BACKEND STORAGE

BACKGROUND

Various types of storage (e.g., non-volatile, volatile storage) are used in computing systems. Non-volatile storage may include storage technologies such as disk drives, SSD, and SCM. Such storage technologies are also used in virtualized computing environments. Virtualization enables the creation of a fully configured computer based entirely on a software implementation, which can be referred to as a virtual machine. Virtual machines may use virtualized storage resources, which are abstractions of actual storage devices that can include various storage technologies. While performance of such storage technologies has continuously improved, the improvements may not be fully realized in virtualized computing environments.

It is with respect to these and other considerations that the disclosure made herein is presented.

SUMMARY

The disclosed embodiments describe technologies that allow various applications such as virtualized resource services to leverage improvements to read and write access times in storage devices. By providing more efficient access to underlying storage devices, applications and service providers may provide virtualized services in a way that allow for improved overall performance based on the improvements available on many storage technologies. By providing such efficient access and the resulting performance improvements, applications and service providers may achieve higher levels of operational performance while improving operating efficiencies, while at the same time improving the user's experience. While the disclosed techniques may be implemented in a variety of contexts and applications, for the purpose of illustration the present disclosure illustrated the techniques in the context of virtualization environments. However, the disclosed techniques may be applicable to any application that accesses storage, such as file share, database, web server, streaming, and other applications.

While virtualization technologies provide many benefits to computing users, current implementations of virtual machines often include many layers of services that may mask the ability to leverage the improvements to access times for storage devices. Storage technologies such as HDD, SSD, and SCM may allow for close to RAM speeds. Additionally, direct memory access methods such as RDMA may also provide low latency network and memory access. The use of hyperconverged infrastructure (HCI) where storage, computing, and networking may be virtualized in an integrated virtualization environment provides further motivation for leveraging the advantages of these new storage technologies. However, with the advent of faster bulk storage devices such as SSD, the time that it takes for tasks and processes to traverse the stacks may exceed the faster access times for the newer storage technologies.

In one example, conventional log-based write cache methods typically consume write logs sequentially to perform de-staging operations or perform various compression tasks such as backend tasks (e.g., log compaction). LSM-tree based storage such as LevelDB uses additional backend tasks that require additional threads, leading to increased CPU usage and resource contention overhead.

Additionally, conventional log-based write cache methods do not take full advantage of backend storage queue depth. It is desirable for log de-stage operations to avoid overlapped data log concurrency, which has led to three conventional ways to address this issue: 1) commit write logs sequentially whenever possible; however, this degenerates to queue depth 1 (QD1) in extreme cases; 2) check for overlap; this is difficult for log-based de-stage because the write operation is a pure append-only log, which is inefficient for de-staging; 3) merged write logs; however, conventional methods use backend jobs and slice multilevel log merging (that is, a log tree), which can cause write amplification problems since the merged log tables at each level also need to be persistent (e.g., written in SSDs).

Rather than the use of layering, the present disclosure describes the use of logical data structures to logically merge logs that are mergeable. The technical benefits of such an approach include 1) logical merge is a memory operation and does not cause write amplification, effectively saving SSD I/Os and CPU usage to write real data; 2) logs with overlap are always merged logically rather than divided into multiple logs, and therefore the overlap of subsequent logs can be checked quickly; 3) logical merges can be used for log suspensions and do not consume significant resources, allowing for subsequent write logs to be sought more aggressively, and allowing flow control to be naturally supported since suspensions and commits can be distinguished.

While traditional backend storage systems can scale the number of I/O dispatchers to consume more I/O operations, for some scenarios (such as a single disk poller thread or a single de-stage thread) there may only be one dispatcher thread per device. In order to scale out the thread count to fully utilize the server CPU for device I/O operations, it would be desirable to dispatch I/O operations to different workers. However, this can lead to multiple interrupts which can cause I/O operations to be inefficient.

The present disclosure addresses the above problems with a thread model and algorithm that leverages single producer single consumer (SPSC) submission queues and completion queues. For the single producer multiple consumers (SPMC) mode, it is not necessary for the dispatcher to determine which worker consumes data, as workers subscribe to the SPMC queue and each worker picks up and consumes I/O operations when not busy. In multiple producers single consumer (MPSC) mode, the reverse is true: the worker does not need to determine which dispatcher to consume the messages from, but instead continues to select I/O operations and submit from the MPSC queue. However, although there are lock-free and wait-free algorithms, atomic operations and the wait times can incur performance overhead. The benefit of SPSC is that it is simple and sufficiently fast, and often only requires visibility and order guarantees. To address the load balance issues, a scoring algorithm is implemented on the backing store dispatcher side and the load balance problem of "to whom" is solved using a min-heap data structure. By implementing consumption queues with different priorities on the backing store worker side, the load balance problem of "whose I/O is consumed" can be solved in combination with polling.

Techniques are described herein for implementing de-staging and backend storage for efficient I/O operations in virtualized environments. In one embodiment, for a log-based write cache, a two skip-list-based data structure is implemented to maintain ongoing I/O operations and suspended I/O operations for fast overlap checking and efficient merging of I/O requests. For page aligned de-stage I/O operations, range sort algorithms are used to sort and logically merge the I/O operations. A buffer is used to send I/O operations as a scatter gather list in order to merge sequential I/O operations and reduce memory copy operations. For backend storage, for a single dispatcher I/O, the disclosed thread model allows for scaling of the I/O threads to increase the speed of dispatch and response with less interrupt notifications, resulting in greater throughput.

By providing such improvements for accessing storage, latencies for performing I/O operations may be reduced. Furthermore, reducing or compressing the stack layers can free up processing and memory resources, allowing for more efficient use of resources.

This Summary is provided to introduce a selection of concepts in a simplified form that are further described below in the Detailed Description. This Summary is not intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, same reference numbers in different figures indicate similar or identical items.

DETAILED DESCRIPTION

Described herein are technologies that allow for improvements to the performance of computing, storage, and network services provided by applications and service providers that utilize storage devices. The disclosed embodiments include ways to improve the function and utilization of various storage input/output (I/O) techniques.

Generally, the present disclosure describes a way to provide for efficient I/O operations in virtualized environments in which a log-based write cache is used. I/O requests in the log are checked for overlap and logically merged. A thread model is used to scale I/O threads to increase dispatch speed. The described techniques provide greater throughput in networks that utilize storage devices.

More specifically, the present disclosure describes techniques for implementing de-staging and backend storage for efficient I/O operations in virtualized environments. For a log-based write cache, a two skip-list-based data structure is implemented to maintain ongoing I/O operations and suspended I/O operations for fast overlap checking and merging of I/O requests, including an online data structure and algorithm. For page aligned de-stage I/O operations, a range sort algorithm is used to sort and logically merge the I/O operations. A buffer is used to send I/O operations as a scatter gather list in order to merge sequential I/O operations and reduce the number memory copy operations. For backend storage, for a single dispatcher I/O, a thread model is used to scale the I/O threads to increase the speed of dispatch and response with less interrupt notifications, resulting in greater throughput.

In an embodiment, a cache service enables low latency access to disk storage by virtual machines or containers. At least some of the high-latency components on the data path are bypassed and data is cached in a read cache or write buffer to leverage faster storage medium speeds and access patterns. In the backing store, in order to provide a complete block device service to the upper layer, a backing store component is implemented at the lowest data storage point in the host cache system. The backing store component is configured to hold data and reduce data access latency on critical data paths.

To improve I/O write performance while ensuring data durability and reliability, the write ahead log of the host cache is stored in persistent memory (PMEM) and is replicated to secondary nodes. To ensure that the write cache can continuously provide data caching functionality, the write log in PMEM is continuously transferred to the mass storage device. This can be referred to as the de-stage workflow of the host cache. In some embodiments, virtual Non-Volatile Memory Express (NVMe) is implemented and a meta server or management server is configured to manage and coordinate tasks and nodes.

Figure 1:
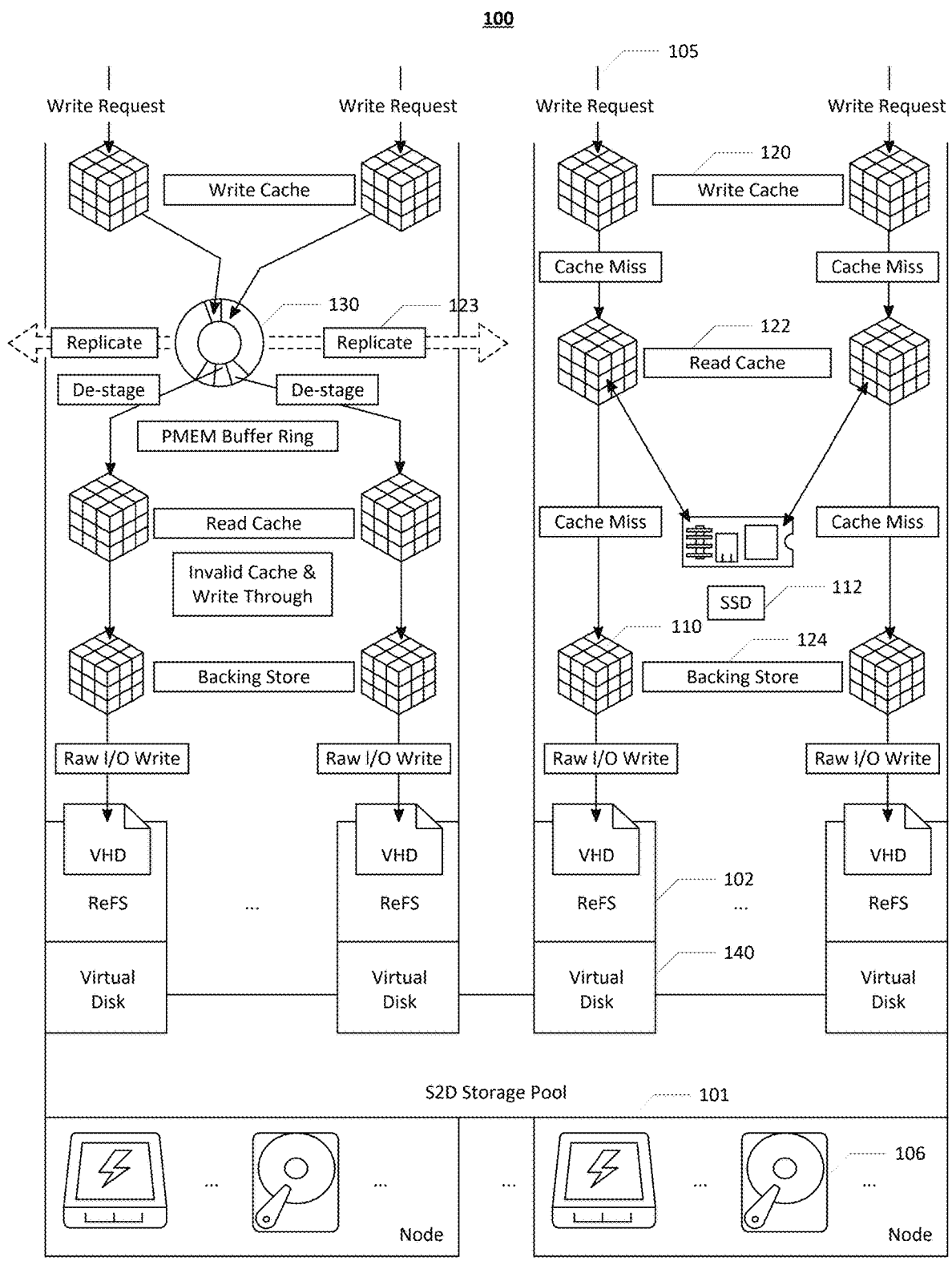
FIG. 1 illustrates an example architecture in accordance with the present disclosure.

FIG. 1 illustrates an example architecture 100 showing aspects of the present disclosure. Illustrated is a Storage Spaces Direct (S2D) storage pool 101 and physical nodes 106 for a storage stack in a virtual computing environment that manages disk resources and automates replication. In an embodiment, for NVME namespaces to be accessed, a ReFS virtual disk volume 102 is implemented. The data of the write cache 120 is stored in the PMEM 110, and the data of the read cache 122 is stored in high-performance SSD 112. Also illustrated are backing store components 124.

In an embodiment, to increase the speed of a write response, the write request 105 is written from the VMs or containers to the read cache 122 with a faster PMEM as storage and a ring buffer 130 is used for the read cache. The ring buffer 130 is used to more quickly append to the log and enable a faster write speed as compared to a random access log. After the data is written to the ring buffer 130, the data can be replicated to other nodes. To achieve high availability, in an embodiment RDMA is used to replicate the data.

In one example, FIG. 1 illustrates data for a node which is replicated 123 to additional nodes as additional write decisions. The written data is retrieved from another point of the ring buffer 130 and assigned to send a decision request to the read cache 122 to perform operations based on a read cache policy. The read cache 122 sends the data to the backing store 124 and to the virtual disk 140. The backing store 124 leverages parallel processing capabilities. The disclosed cache layer accelerates storage read and write I/O operations as further described herein, which provides improved performance and better than expected results as compared to existing ways of implementing the illustrated components.

The locality of the data access can be considered when I/O operations overlap because when operations are performed one at a time, a subsequent operation will not be submitted until the previous de-stage operation is complete. FIGS. 2A through 2D illustrate a process to maintain ongoing I/O operations and suspended I/O operations for faster overlap checking and for efficient merging of requests using an online data structure and algorithm. In an embodiment, to ensure that de-staging is correctly and efficiently executed, components can be implemented to track ongoing I/O requests at the de-stage layer to ensure that no submitted requests are overlapped, and to temporarily suspend I/O requests that are not to be submitted at the current time, for example due to overlap, queue limitations, and the like.

Figure 2A:
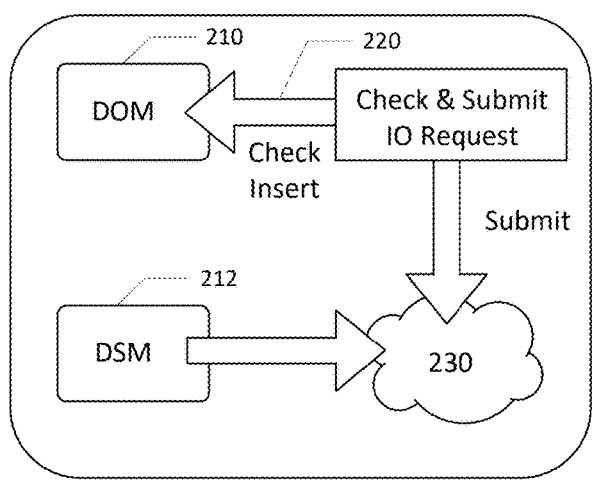
FIGS. 2A through 2E illustrate an example architecture in accordance with the present disclosure.
Figure 2B:
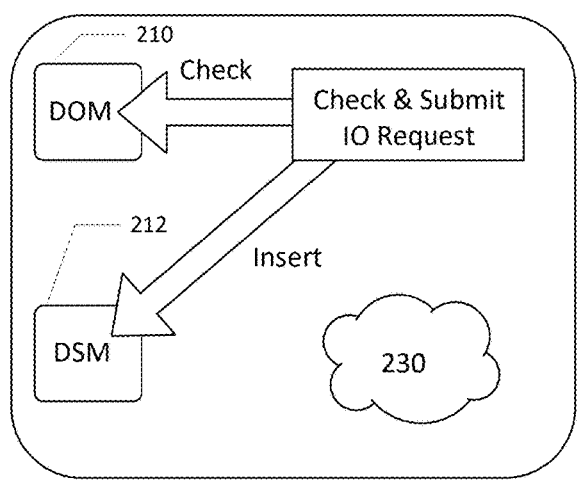
Figure 2C:
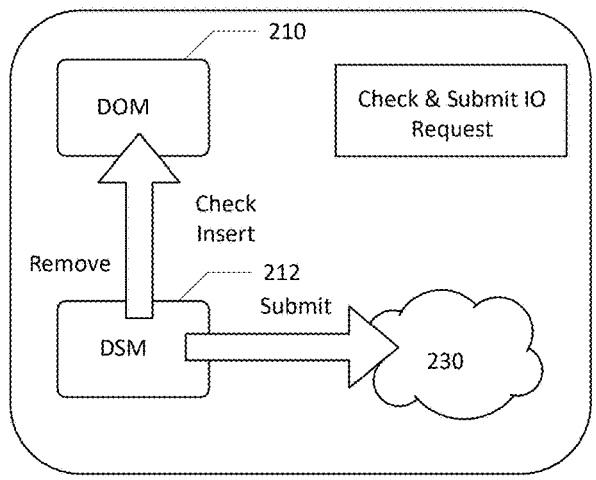
Figure 2D:
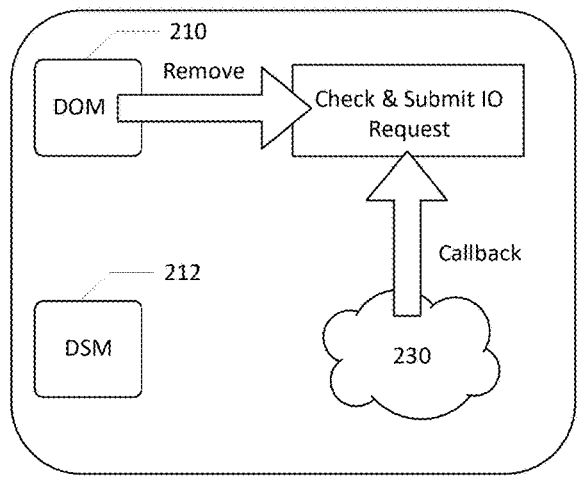

In an embodiment, a de-stage ongoing I/O manager (DOM) 210 and de-stage suspended I/O manager (DSM) 212 are implemented. After receiving a write log request (e.g., a write request to the log), a check is performed 220 to determine if there is overlap with a previously suspended I/O operation. If there is overlap, the I/O request is inserted into the DSM 212 (FIG. 2B). Otherwise, if there is no overlap, the I/O request is submitted to backing store 230. To complete an I/O operation, the write request is removed from the DOM 210 (FIG. 2D) and I/O operations that have no overlap with ongoing I/O from the DSM 212 are submitted (FIG. 2C). Thus, duplicated submissions can be reduced and I/O operation speed can be improved by merging overlapped I/O operations in the DSM 212.

Figure 2E:
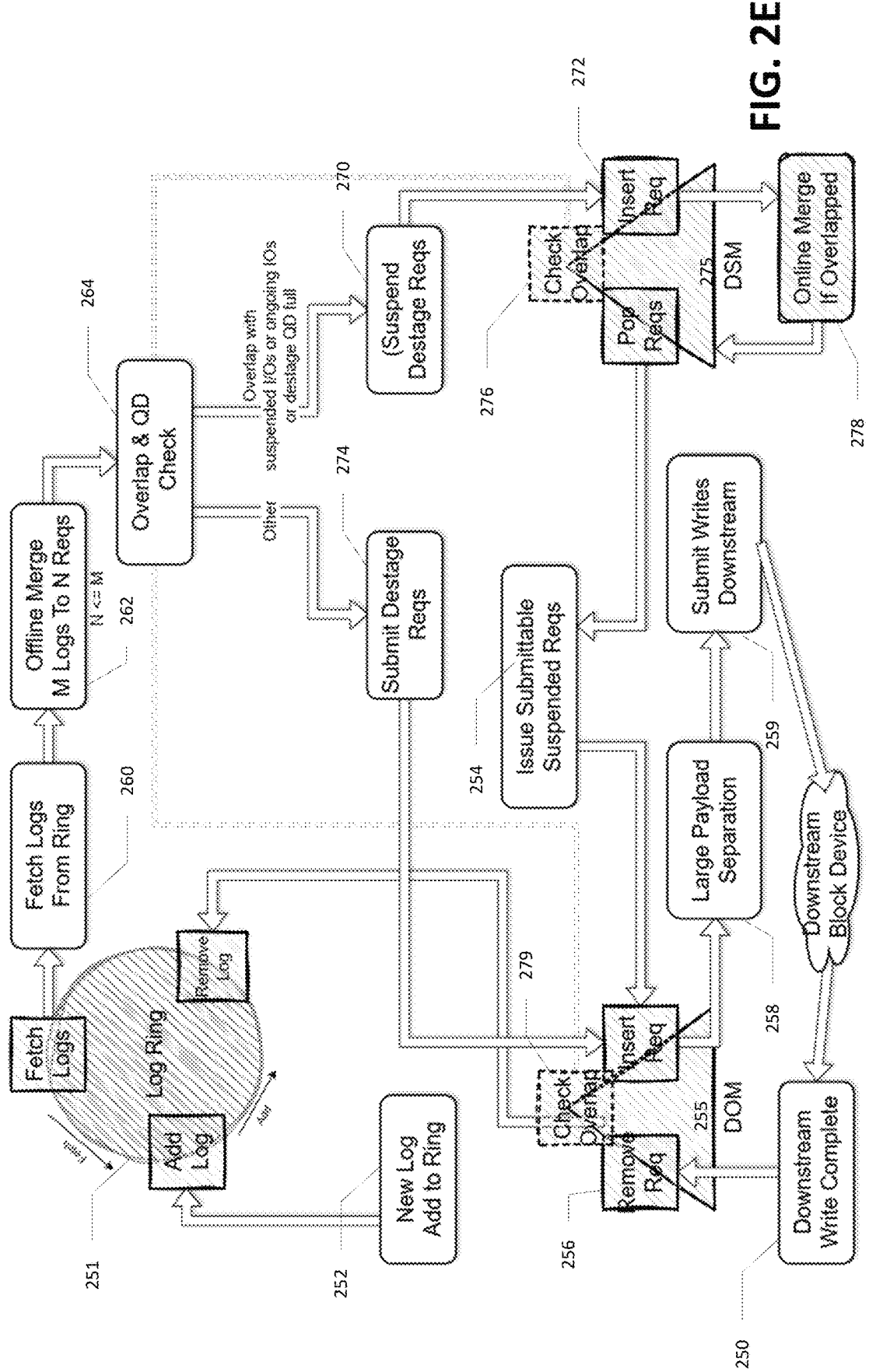

FIG. 2E illustrates an overview of operations for maintaining ongoing I/O operations and suspended I/O operations in accordance with the disclosure. When downstream writes are complete 250, or when new logs are added 252 to the log ring structure 251, submittable suspended requests in the DSM are issued 254. Requests in the DOM 255 are checked for overlap 279. In an embodiment, a range skip list is implemented for overlap checking. In some embodiments, large payloads can be separated 258 using an overlap shadow table before sending requests downstream 259.

When downstream writes are complete 250, completed requests are removed 256 from the DOM 255. When logs are fetched 260 from the log ring structure 251, a merge is performed 262. In an embodiment, M logs are merged to N requests, where N<=M. In an embodiment, a range sort is implemented to perform the merge.

Requests are checked for overlap and queue depth (QD) 264. If a request has overlap with suspended I/Os or ongoing I/Os, or if the NVME Namespace (NNS) destage queue depth (QD) is full, the request is suspended 270 and inserted 272 into the DSM 275. A check for overlap 276 is performed and requests are merged 278 if there is overlap of requests in the DSM 275. In an embodiment, a range skip list is used for the merging. For requests that do not overlap with suspended I/Os or ongoing I/Os, and if the NVME Namespace (NNS) destage QD is not full, then the request is submitted 274 for destaging and inserted into the DOM 255.

Figure 3A:
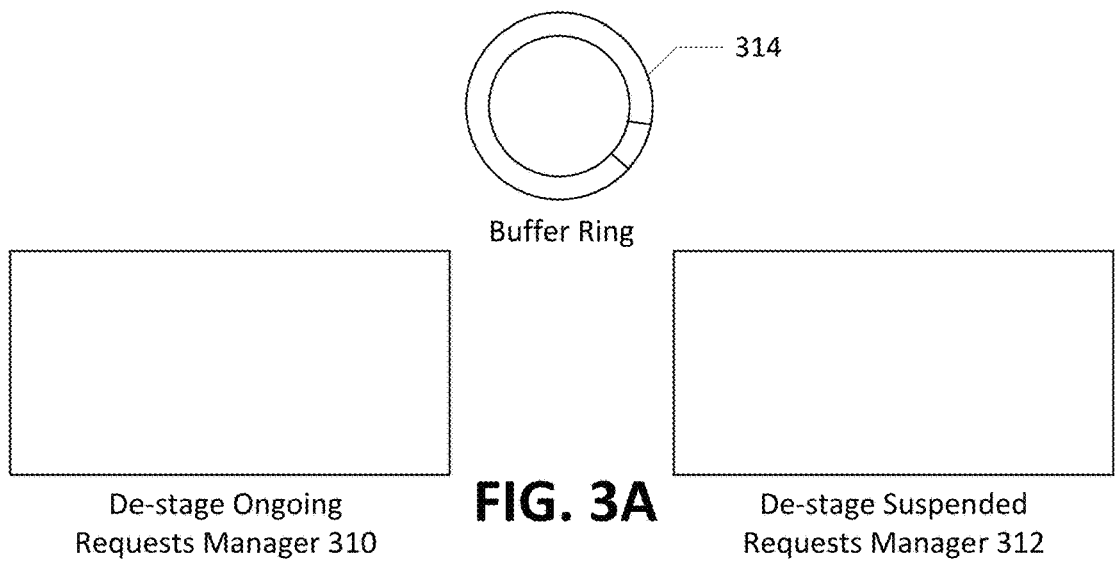
FIGS. 3A through 3E illustrate an example architecture in accordance with the present disclosure.

Referring to FIG. 3A, illustrated is an example of the operation of DOM 310, DSM 312, and buffer ring 314. FIG. 3A illustrates that for the initial state of the DOM 310 and DSM 312 are empty data structures.

Figure 3B:
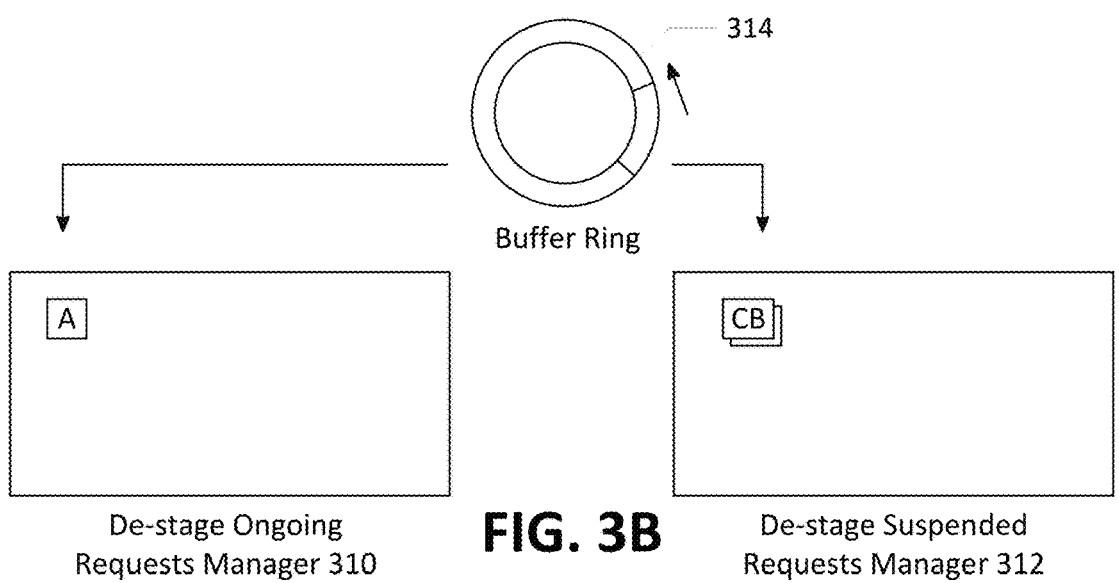

Referring to FIG. 3B, logs are received from the buffer ring 314 including logs A, B, and C. Log A is inserted into the DOM 310 which is empty. Log B is checked for overlap and, in this example, it is determined that B has overlap with A and thus log B is inserted into the DSM 312 directly because the DSM 312 is empty. The next log C is obtained from the buffer ring 314 and is checked for overlap with the DSM 312. In this example, logs B and C have overlap and are logically merged and suspended.

Figure 3C:
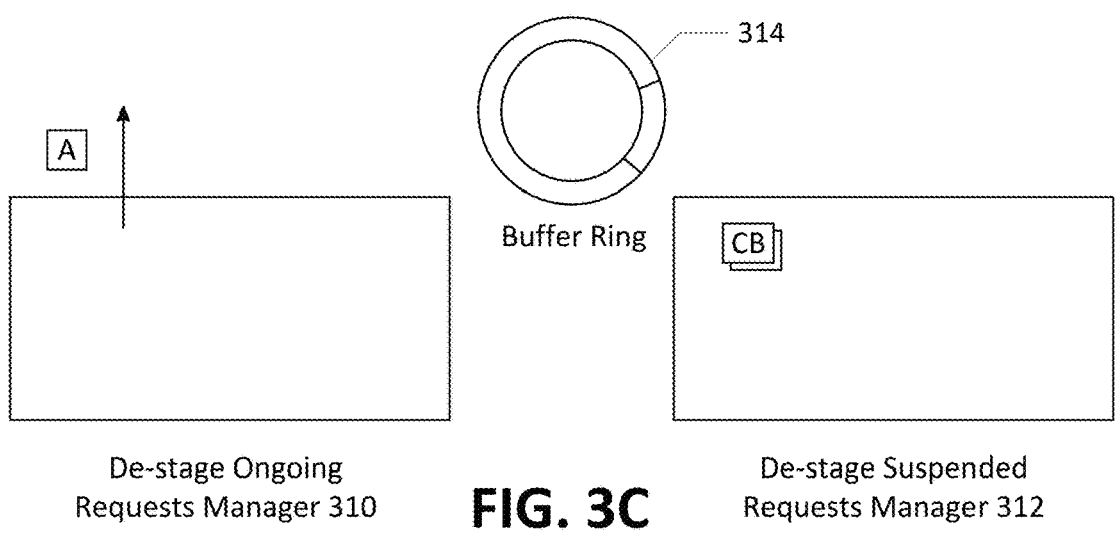
Figure 3D:
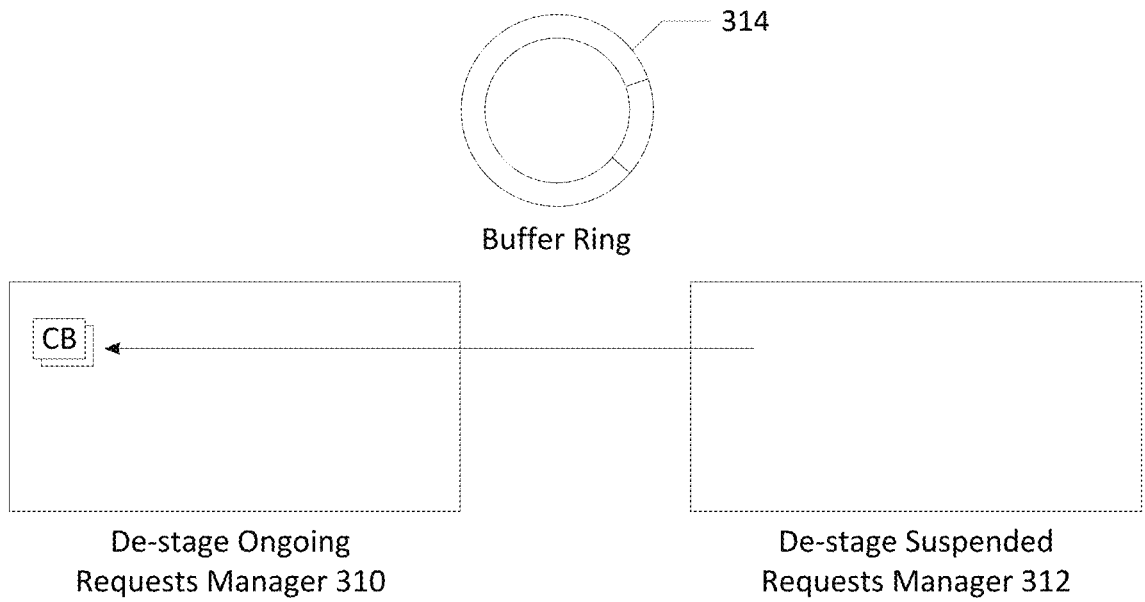

FIG. 3C illustrates that request A is completed and is removed from the DOM 310. The suspended operations B and C in the DSM 312 can be de-staged. In FIG. 3D, requests B and C are now submitted and removed from the DSM 312 and inserted into the DOM 310 and marked as outgoing.

Figure 3E:
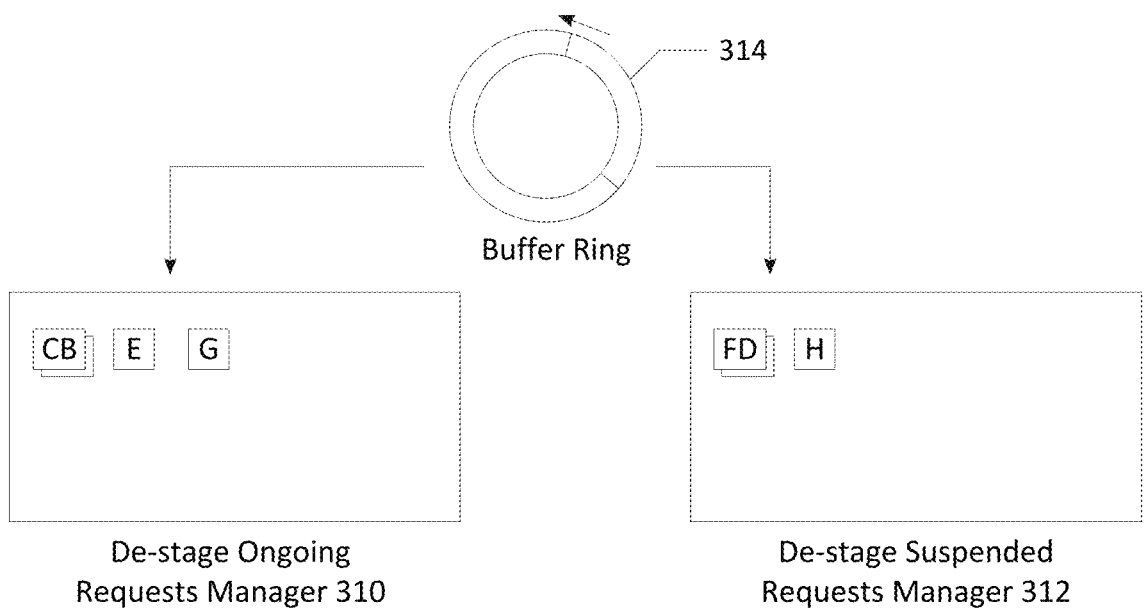

FIG. 3E illustrates obtaining more logs from the buffer ring 314. In the example, log D has overlap with on-going request BC, so these logs are inserted into the DSM 312 and suspended. Logs E and G have no overlap and are submitted to the DOM 310. Logs D and F have overlap and are merged into one request. Log H can subsequently be submitted to DOM 310.

Figure 4:
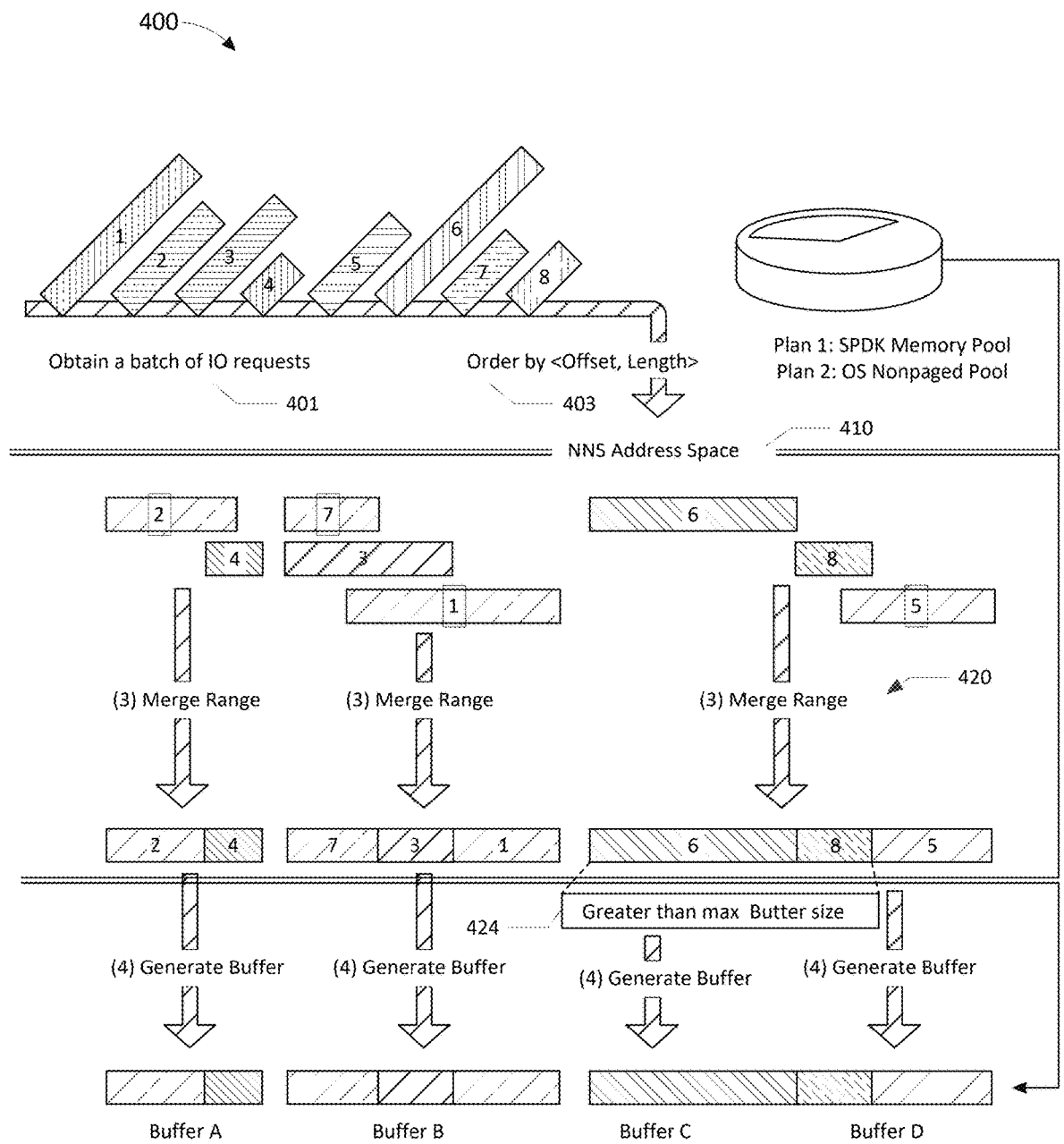
FIG. 4 illustrates an example architecture in accordance with the present disclosure.

Referring to FIG. 4, to increase the speed of sequential write operations, a process 400 is illustrated for merging operations between the buffer ring and the DSM and DOM operations. The described methodology can provide efficient operations through the use of larger payloads rather than multiple smaller payloads. A batch of de-stage requests are obtained 401, for example from the data structures illustrated in FIGS. 3A through 3E. In an embodiment, scanning from left to right, if a snapshot log (e.g., a change log or delta log) is found, then it is split into left and right subarrays and recursively processed. The logs are ordered 403 by the logical block address (LBA) offset and I/O length to arrange the logs in the NNS address space 410. Scanning from left to right, if adjacent ranges are found that can be merged and the length of the merged range does not exceed a maximum buffer size, then merging 420 is performed. The merged coverage relation is determined based on the original order of requests. The memory buffer is fetched and the original data is copied to the buffer based on the merged ranges.

In an example, write logs are assigned a sequential number from 1 to 8 and are sorted according to the offset of the LBA from the smallest to largest. In the example shown in FIG. 4, as the I/O requests are scanned, there is an overlap between requests 2 and 4 where the region of the log with a larger ID (request 4) overrides the one with a smaller ID (request 2). Requests 1, 3, and 7 have overlap, and requests 5, 6, and 8 have overlap. Thus the eight write logs are merged 420 into three merged write operations. In order to prevent the merged requests from being too large, the size of each request is checked. If the merged logical range is too large, then the request can be split into several ranges that meet a threshold. If the total range exceeds a maximum buffer size 424, then the merged request (e.g., 5, 6, and 8) can be split into two buffers with different logical ranges. In an embodiment, the merging operation can be performed before the above described DOM DSM process.

Figure 5:
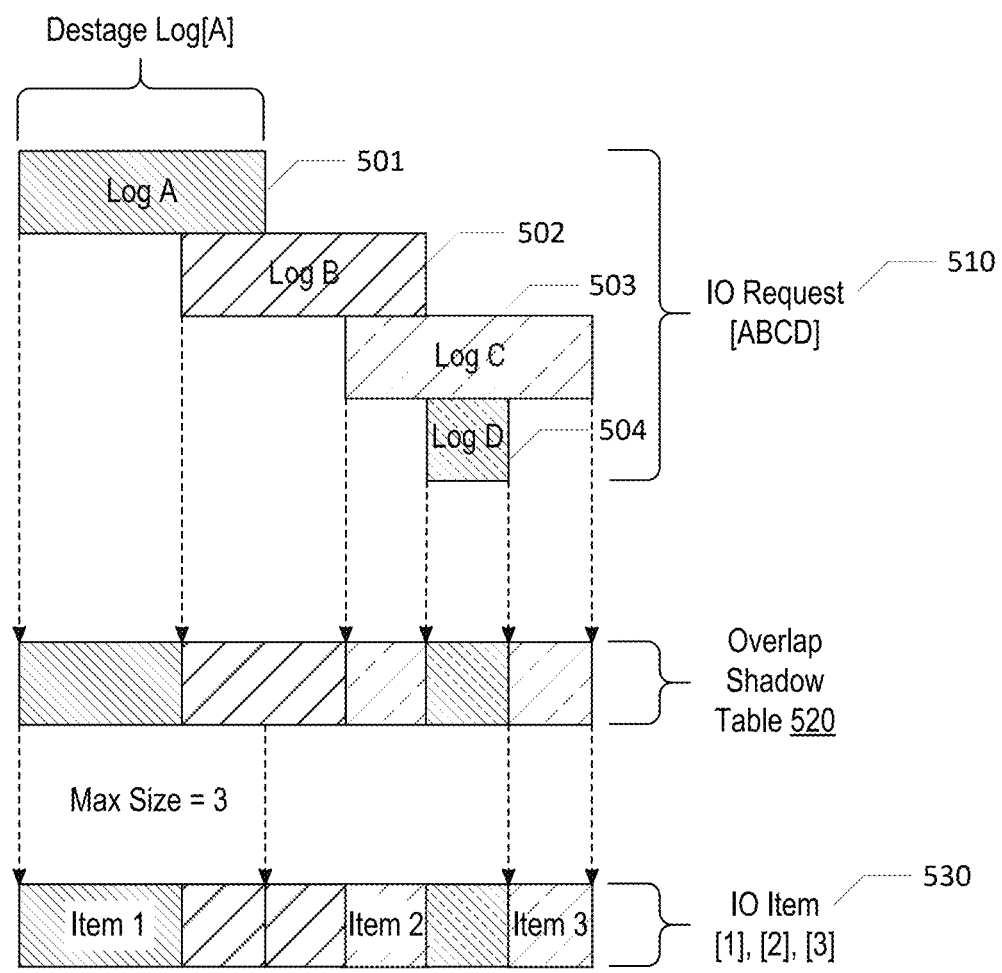
FIG. 5 illustrates an example architecture in accordance with the present disclosure.

Suspended I/O operations in the DSM can potentially continue to merge as long as there continue to be overlapping operations. In order to avoid submission of I/O operations that are too large, an overlap shadow table is implemented as illustrated in FIG. 5. In an embodiment, the overlap shadow table is a logical data structure. A logically merged request 510 is flattened onto the shadow table and split into multiple logical objects that do not exceed a threshold limitation to submit to a downstream log device.

In the example of FIG. 5, log A 501, log B 502, log C 503, and log D 504 are suspended and logically merged into one I/O request 510. Before submission, the overlap shadow table 520 is created and is divided into multiple I/O items based on a maximum size threshold (3 blocks in this example). Thus the overlap shadow table 520 is divided into three I/O items 530, and three logical logs are written rather than the original four logs and duplicated write operations are avoided.

Figure 6:
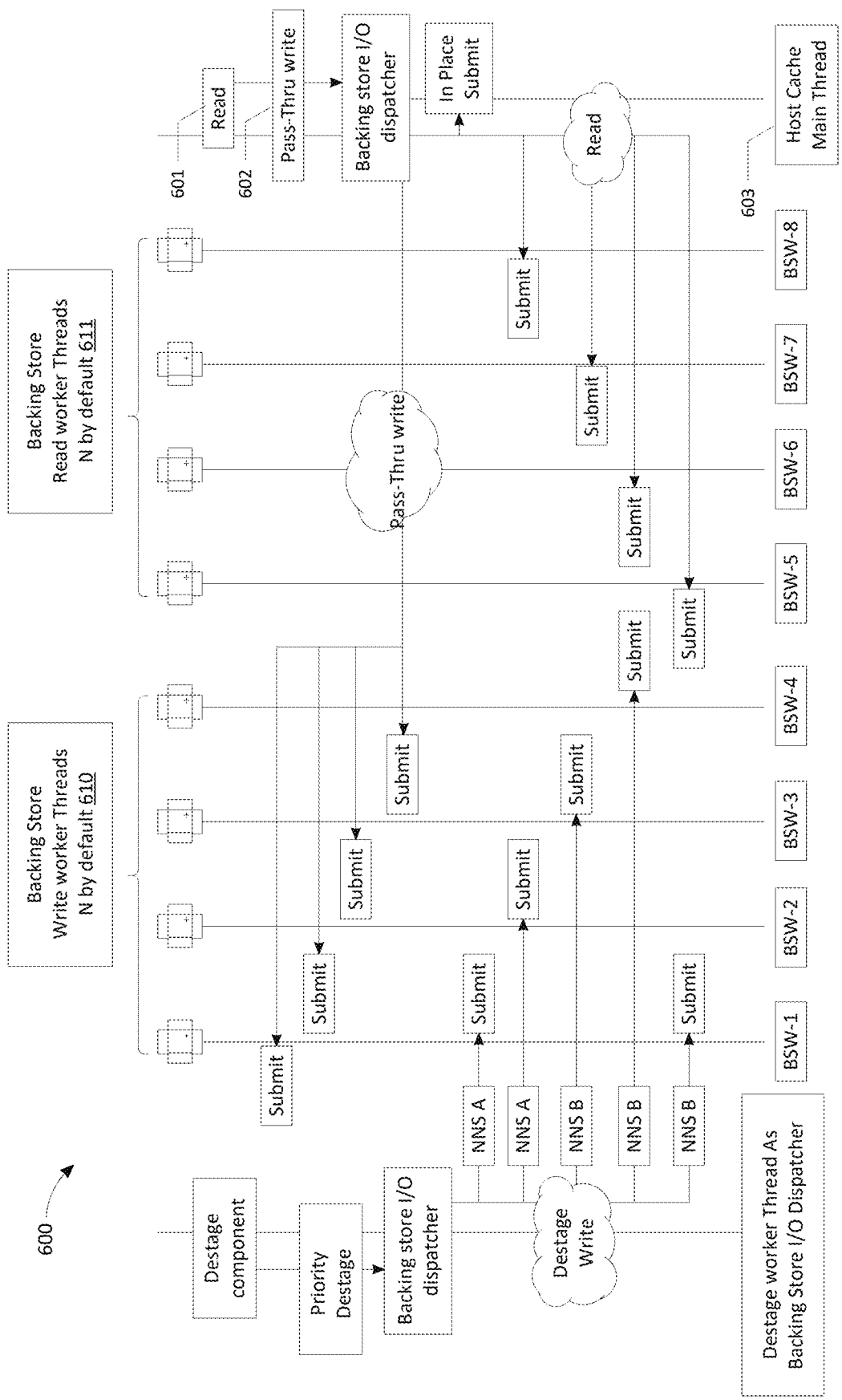
FIG. 6 illustrates an example architecture in accordance with the present disclosure.

With reference to FIG. 6, a share model 600 is illustrated for providing high I/O throughput for the backing store. In an embodiment, multiple worker threads 610, 611 can be used to handle I/O requests being submitted to the backing store. In an embodiment, read and write share pools can be implemented with the backing store as well as the de-stage component. In an embodiment, for write requests triggered by the de-stage process, write requests are forwarded to multiple worker threads. For read requests 601 and pass-through write requests 602 on the main polling thread 603 from the cache layer, the requests can be placed (in current thread) for small queue depth (QD) workloads to avoid interrupts and gain improved latency, or dispatched to backing store worker threads (similar to de-stage) to gain improved throughput.

Figure 7:
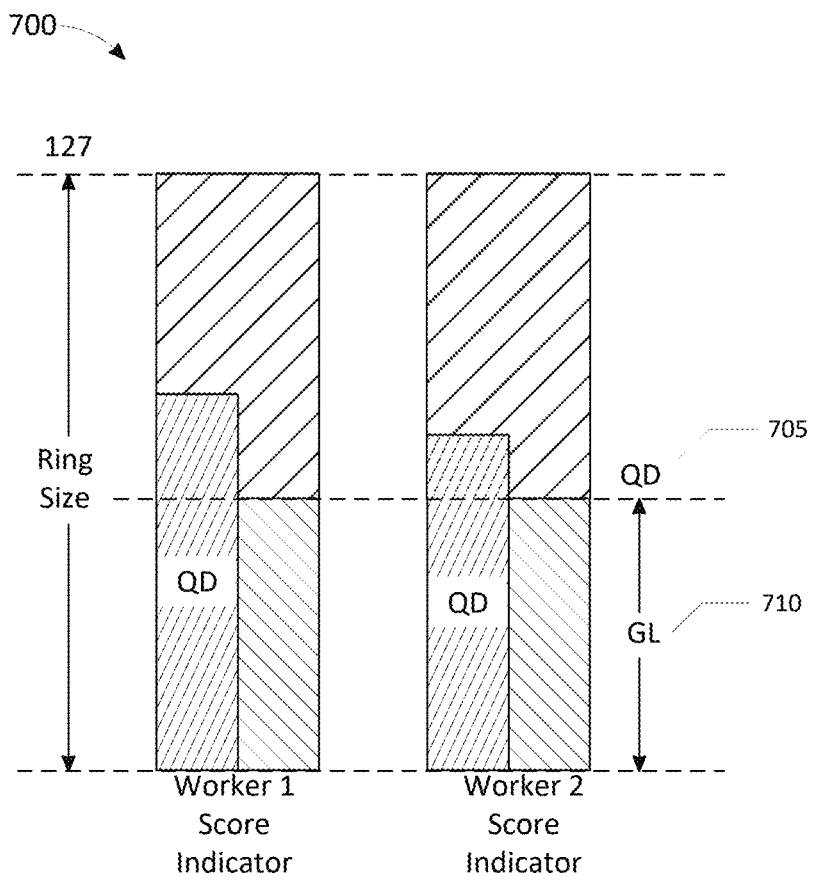
FIG. 7 illustrates an example architecture in accordance with the present disclosure.

Referring to FIG. 7, for each pair of back-end store dispatchers and workers, a dedicated queue pair is created. In an embodiment, for the backstop dispatcher a min-heap data structure is implemented and combined with a scoring algorithm as shown below to determine the workers to which requests are to be distributed. The queue depth (QD) 705 and baseline value indicates a guard line (GL) 710 for calculating the load balance score of the min-heap to ensure that for each I/O operation, each queue for each worker is filled to the baseline value before distributing I/O evenly. In one embodiment, min-heap with the following score indicator is used to load balance and select a queue and worker from the dispatcher for the I/O operations. The guard line (GL) refers to a comparator with QD in the queue.

If QD<GL, score=GL-QD, else score=QD

As used herein, "persistent memory" may refer to a memory device that retains information when power is withdrawn. Persistent memory may be addressable over a memory bus.

As used herein, "volatile memory" refers to a storage device that loses data when the device's power supply is interrupted. Power may be interrupted due to a power outage, battery exhaustion, manual reboot, scheduled reboot, or the like.

Non-volatile memory may use memory cells that include one or more memory technologies, such as a flash memory (e.g., NAND, NOR, Multi-Level Cell (MLC), Divided bit-line NOR (DINOR), AND, high capacitive coupling ratio (HiCR), asymmetrical contactless transistor (ACT), or other Flash memory technologies), a Resistive Random Access Memory (RRAM or ReRAM), or any other type of memory technology. The memory cells of non-volatile memory may be configured according to various architectures, such as a byte modifiable architecture or a non-byte modifiable architecture (e.g., a page modifiable architecture).

Non-volatile memory also may include support circuitry, such as read/write circuits. Read/write circuits may be a single component or separate components, such as read circuitry and write circuitry.

As discussed herein, in a log-based write cache, incoming data writes are temporarily stored in a sequential log or journal before being permanently written. This log-based write cache is typically stored in a fast volatile memory or non-volatile memory.

A skip list is a probabilistic data structure that includes a series of linked lists where each list is a level of a tier of nodes in the data structure. Nodes at the bottom level contain the actual data elements, while nodes on higher levels act as shortcuts to traverse the structure more quickly.

A fast overlap check and merge I/O request is used when multiple I/O requests overlap in the data being accessed in storage. If a request overlaps with one or more existing requests, the overlapping requests are merged into a single larger request.

Page-aligned de-stage I/O refers to moving data from cache to permanent storage in a manner that is page-aligned.

Range sort refers to the sorting of several ranges, where each has an interval with a left bound and right bound indicating the I/O offset and length.

A scatter-gather list is a data structure used to manage the transfer of data between multiple non-contiguous memory locations. Instead of transferring a single contiguous block of data, multiple disjoint or scattered memory regions are transferred in a single I/O operation, and data is aggregated from multiple non-contiguous memory regions into a single contiguous buffer.

Single or one dispatcher I/O refers to a system architecture where a single central dispatcher is responsible for managing I/O operations.

In an embodiment, a data storage device may be coupled to a host device and configured as embedded memory. In another embodiment, the data storage device may be a removable device that is removably coupled to host device. For example, the data storage device may be a memory card. A data storage device may operate in compliance with a JEDEC industry specification, one or more other specifications, or a combination thereof. For example, the data storage device may operate in compliance with a USB specification, a UFS specification, an SD specification, or a combination thereof.

The data storage device may be coupled to the host device indirectly, e.g., via one or more networks. For example, the data storage device may be a network-attached storage (NAS) device or a component (e.g., a solid-state drive (SSD) device) of a data center storage system, and enterprise storage system or a storage area network.

The host device may generate commands (e.g., read commands, write commands, flush commands, or other commands) for the data storage device.

Many processing devices utilize caches to reduce the average time required to access information stored in a memory. A cache is typically a smaller and faster memory that stores copies of instructions and/or data that are expected to be used relatively frequently. A cache may be implemented as embedded memory in a persistent storage such as a hard disk drive (HDD). The cache may act as a buffer between other functions of the computer and the persistent storage.

For example, central processing units (CPUs) may use a cache or a hierarchy of cache memory elements. Processors other than CPUs, such as, for example, graphics processing units and others, may also use caches. Instructions or data that are expected to be used by the CPU may be moved from main memory into the cache. When the CPU needs to read or write a location in the main memory, the CPU may first check to see whether the desired memory location is included in the cache memory. If this location is included in the cache, then the CPU can perform the read or write operation on the copy in the cache memory location. If this location is not included in the cache, then the CPU must access the information stored in the main memory and, in some cases, the information can be copied from the main memory and added to the cache.

Caches are typically flushed prior to powering down the CPU or some other event. Flushing the cache may include writing back modified or "dirty" cache lines to the main memory or persistent memory and optionally invalidating the lines in the cache. Microcode can be used to sequentially flush different cache elements in the CPU cache. Cache flushing may be performed, for example, for some instructions performed by the CPU. Cache flushing may also be performed to support powering down the CPU for various power saving states. Cache flushing may therefore be performed frequently. Performing flushing of the caches may take a number of clock cycles in typical embodiments, although the number of clock cycles may vary depending on the size of the caches and other factors.

A cache controller may be implemented to control and coordinate flushing the caches. Persons of ordinary skill in the art should appreciate that in various embodiments portions of the cache controller may be implemented in hardware, firmware, software, or any combination thereof. Moreover, the cache controller may be implemented in other locations internal or external to the CPU.

The cache controller may be electronically and/or communicatively coupled to the cache. In some embodiments, other elements may intervene between the cache controller and the caches. In the interest of clarity, the present description does not describe all of the interconnections and/or communication pathways between the elements in the devices described herein.

Figure 8:
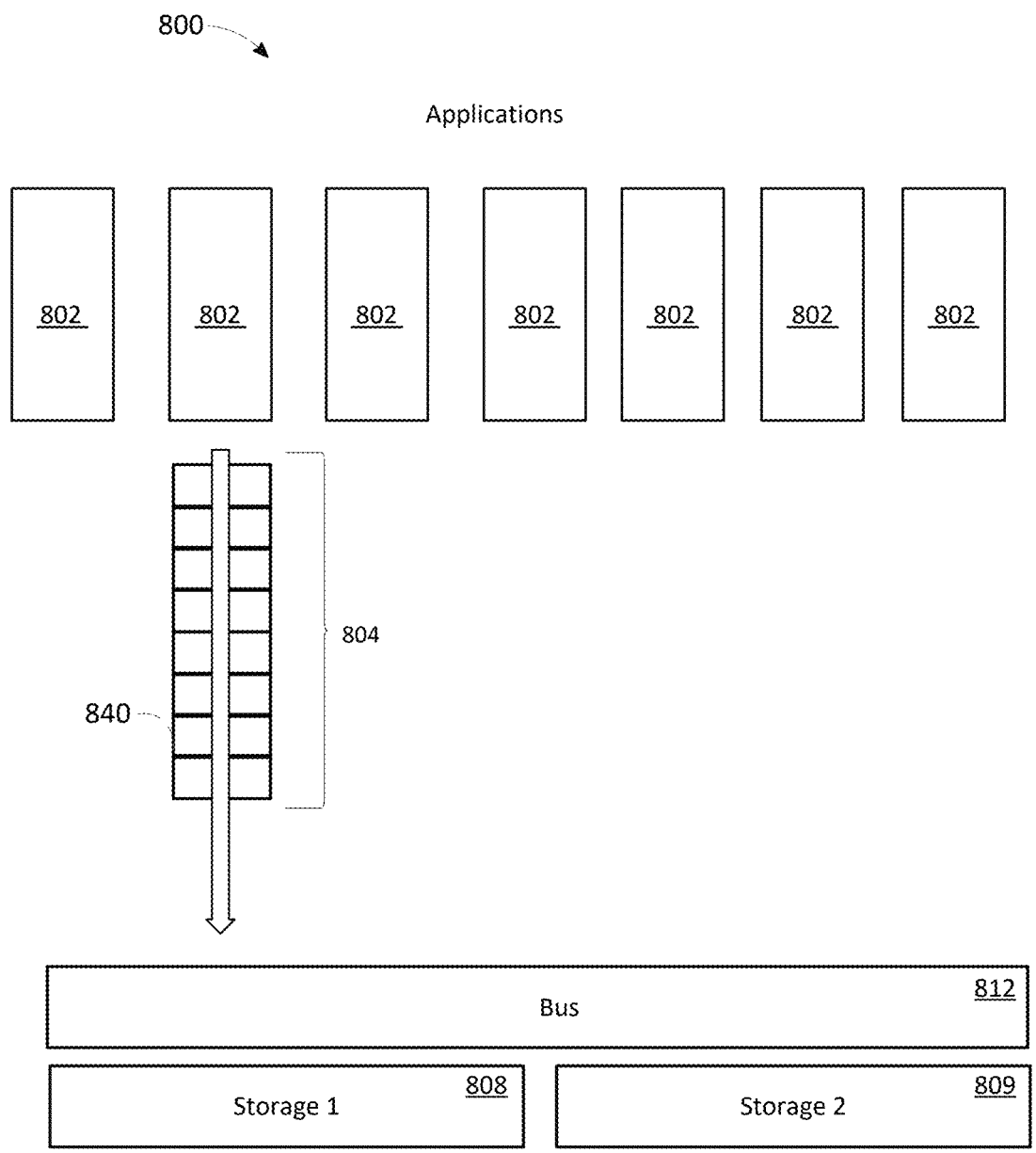
FIG. 8 illustrates an example architecture in accordance with the present disclosure.

Referring to FIG. 8, illustrated is a computing environment 800 that may be viewed as a collection of shared computing resources and shared infrastructure. The computing environment may include a number of applications 802 that are running in the computing environment 800. For example, the computing environment 800 may be a virtualized computing environment that may include virtual machine containers. The virtual machine containers may be hosted on physical hosts that may vary in hardware and/or software configurations. Each container may be capable of hosting a virtual machine. Computing environment 800 may also include one or more routers (not shown on FIG. 8) which may service multiple physical hosts to route network traffic. A controller or provisioning server (not shown in FIG. 8) may include a memory and processor configured with instructions to manage workflows for provisioning and de-provisioning computing resources as well as detecting and accessing storage resources. As shown in FIG. 8, an application 802 may access a bus 812 to read or write data to storage type 1 808 or storage type 2 809. In order to do so, services provided by stack 804 comprising a number of layers are traversed such as file system, storage, and other stack layers. As discussed, the application of the described techniques is illustrated in the context of virtualized services but are not limited to virtualized services. Any application that accesses or otherwise utilizes storage devices and services may implement the described techniques.

Figure 9A:
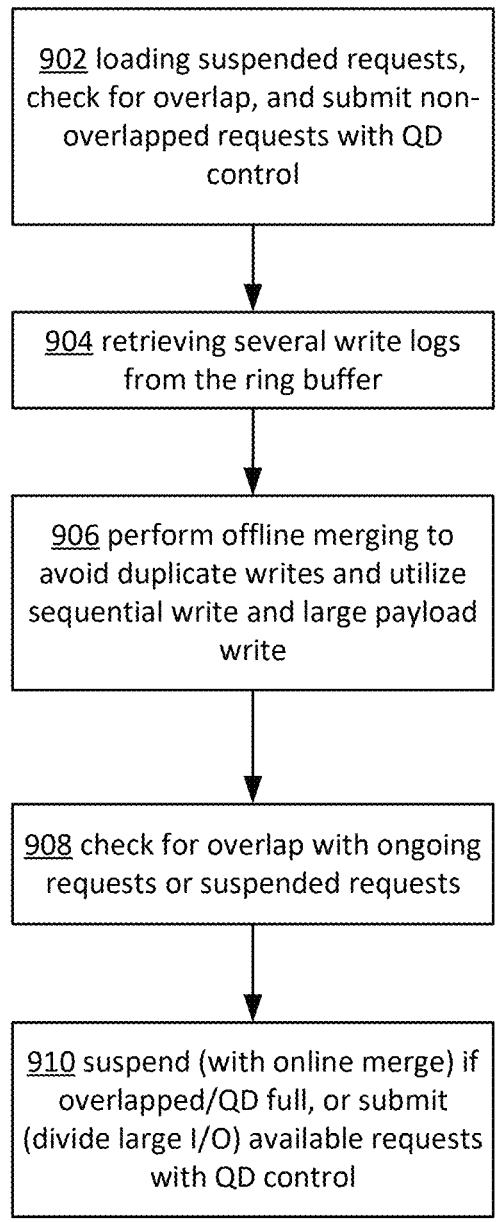
FIGS. 9A and 9B illustrate an example procedure in accordance with the present disclosure.

Turning now to FIG. 9A, illustrated is an example operational procedure for performing a memory operation in a virtual computing network with virtualized computing and storage resources in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 9A, operation 902 illustrates loading suspended requests, checking for overlap, and submitting non-overlapped requests with QD control.

Operation 904 illustrates retrieving several write logs from the ring buffer.

Operation 906 illustrates performing offline merging to avoid duplicate writes and utilizing sequential write and large payload write.

Operation 908 illustrates checking for overlap with ongoing requests or suspended requests.

Operation 910 illustrates suspending (with online merge) if overlapped/QD is full, or submitting (divide large I/O) available requests with QD control.

Figure 9B:
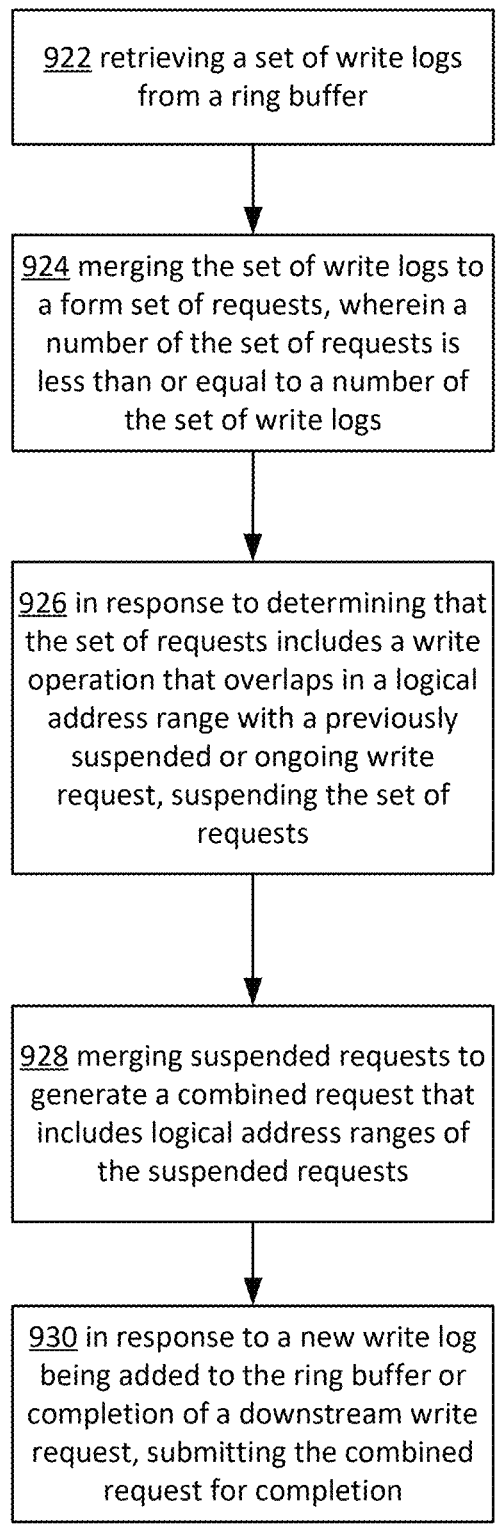

Referring to FIG. 9B, illustrated is another example operational procedure for performing a memory operation in a virtual computing network with virtualized computing and storage resources in accordance with the present disclosure.

Referring to FIG. 9B, operation 922 illustrates retrieving a set of write logs from a ring buffer.

Operation 924 illustrates merging the set of write logs to a form set of requests. In an embodiment, a number of the set of requests is less than or equal to a number of the set of write logs.

Operation 926 illustrates in response to determining that the set of requests includes a write operation that overlaps in a logical address range with a previously suspended or ongoing write request, suspending the set of requests.

Operation 928 illustrates merging suspended requests to generate a combined request that includes logical address ranges of the suspended requests.

Operation 930 illustrates in response to a new write log being added to the ring buffer or completion of a downstream write request, submitting the combined request for completion.

Figure 10A:
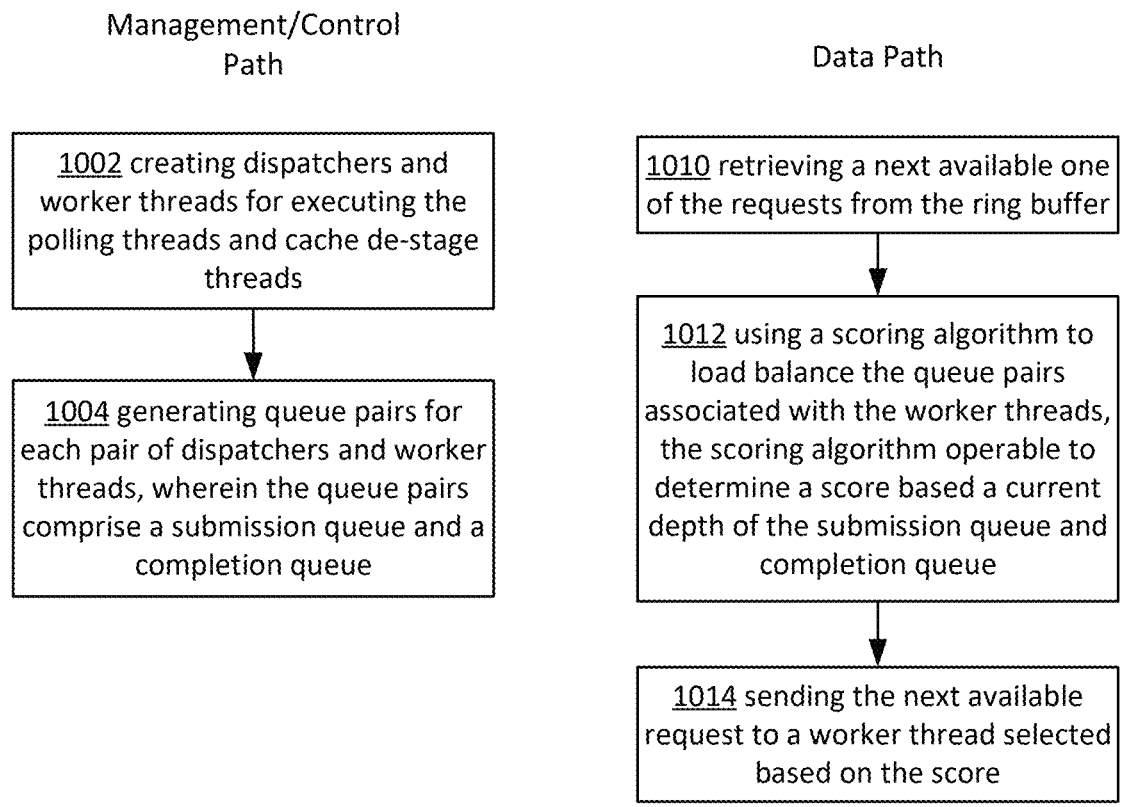
FIGS. 10A and 10B illustrate an example procedure in accordance with the present disclosure.

Referring to FIG. 10A, illustrated is another example operational procedure for performing a memory operation in a virtual computing network with virtualized computing and storage resources in accordance with the present disclosure.

Referring to FIG. 10A, a management/control path includes operation 1002 which creating dispatchers and worker threads for executing the polling threads and cache de-stage threads.

Operation 1004 illustrates generating queue pairs for each pair of dispatchers and worker threads, wherein the queue pairs comprise a submission queue and a completion queue.

A data path includes operation 1010 which illustrates retrieving a next available one of the requests from the ring buffer.

Operation 1012 illustrates using a scoring algorithm to load balance the queue pairs associated with the worker threads, the scoring algorithm operable to determine a score based a current depth of the submission queue and completion queue.

Operation 1014 illustrates sending the next available request to a worker thread selected based on the score.

Figure 10B:
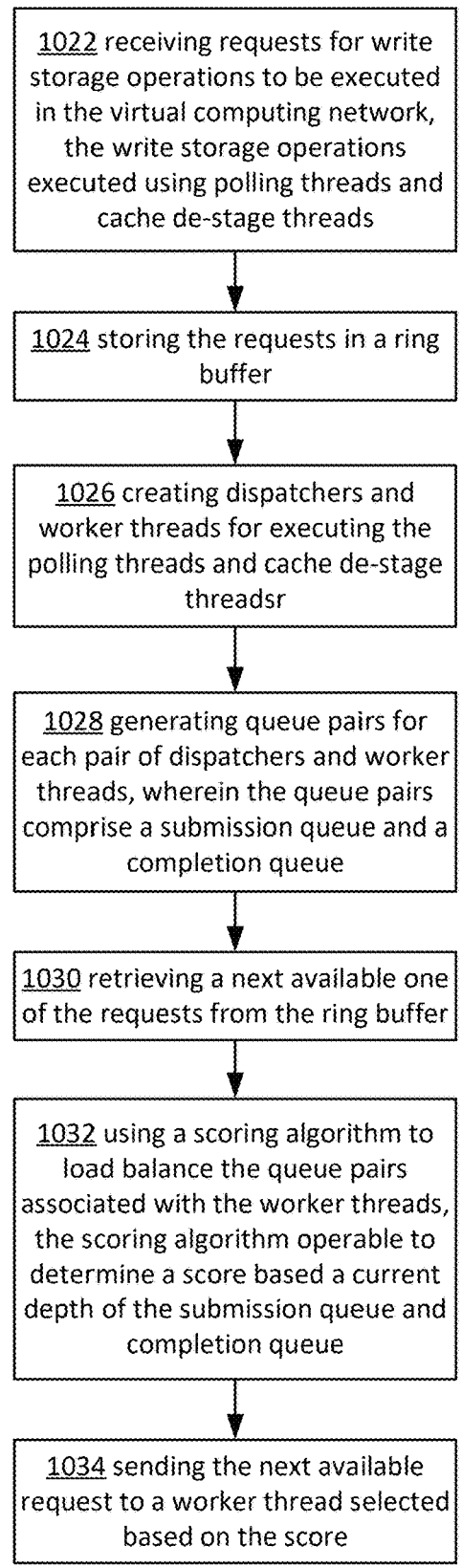

Referring to FIG. 10B, illustrated is another example operational procedure for performing a memory operation in a virtual computing network with virtualized computing and storage resources in accordance with the present disclosure.

Referring to FIG. 10B, operation 1022 illustrates receiving requests for write storage operations to be executed in the virtual computing network. In an embodiment, the write storage operations are executed using polling threads and cache de-stage threads.

Operation 1024 illustrates storing the requests in a ring buffer.

Operation 1026 illustrates creating dispatchers and worker threads for executing the polling threads and cache de-stage threads.

Operation 1028 illustrates generating queue pairs for each pair of dispatchers and worker threads. In an embodiment, the queue pairs comprise a submission queue and a completion queue.

Operation 1030 illustrates retrieving a next available one of the requests from the ring buffer.

Operation 1032 illustrates using a scoring algorithm to load balance the queue pairs associated with the worker threads. In an embodiment, the scoring algorithm is operable to determine a score based a current depth of the submission queue and completion queue.

Operation 1034 illustrates sending the next available request to a worker thread selected based on the score.

Figure 11:
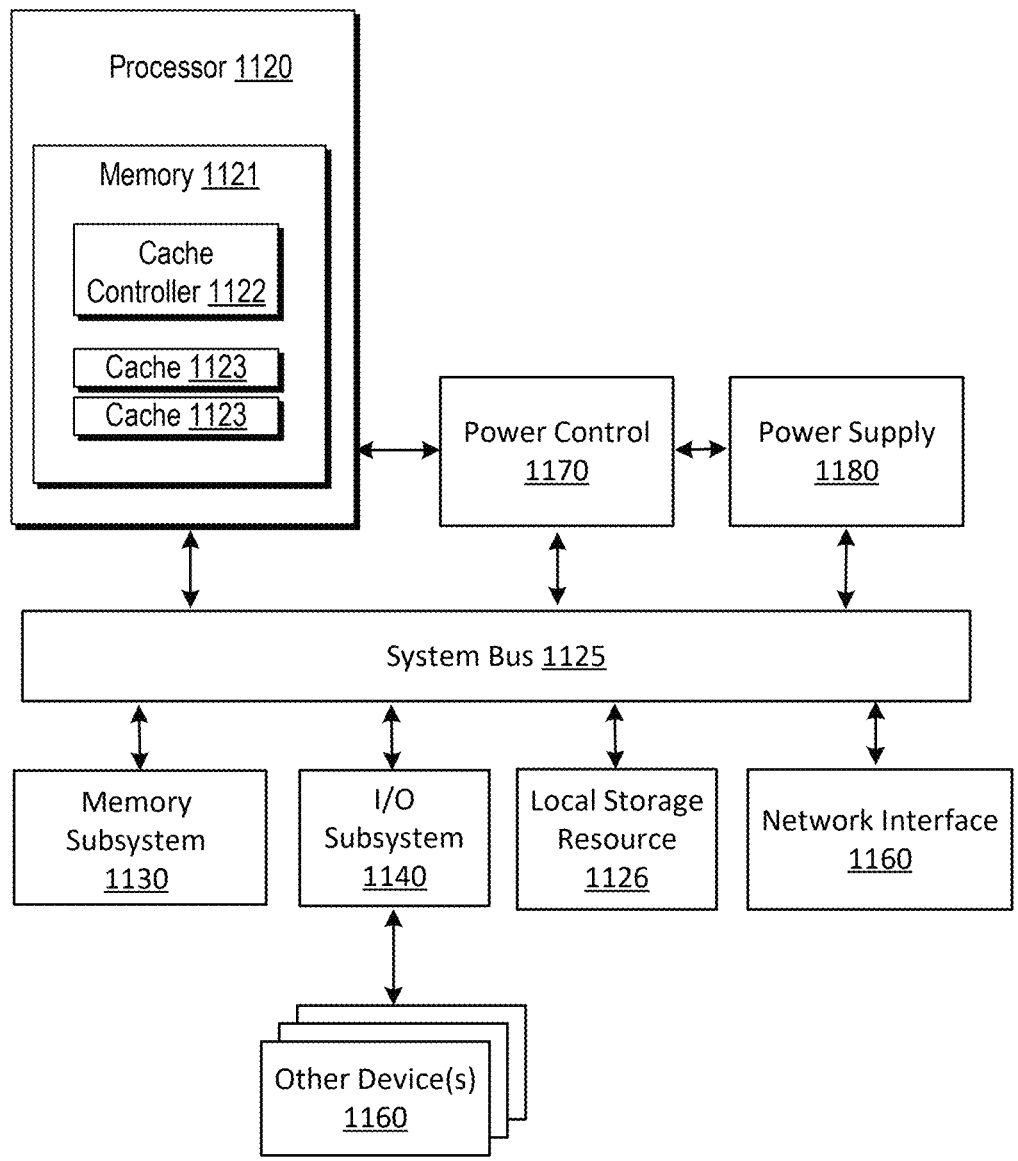
FIG. 11 illustrates an example architecture in accordance with the present disclosure.

FIG. 11 illustrates a block diagram depicting selected elements of an embodiment of a computing environment 1100. As described herein, computing environment 1100 may represent a computing device such as a personal computer system, a desktop computer, a server, etc. As shown in FIG. 11, components of computing environment 1100 may include, but are not limited to, processor subsystem 1120, which may comprise one or more processors, and system bus 1125 that communicatively couples various system components to processor subsystem 1120 including, for example, a memory subsystem 1130, an I/O subsystem 1140, local storage resource 1126, and a network interface 1160. System bus 1125 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 11, network interface 1160 may be a suitable system, apparatus, or device operable to serve as an interface between computing environment 1100 and a network (not shown in FIG. 11). Network interface 1160 may enable computing environment 1100 to communicate over the network using a suitable transmission protocol and/or standard, including, but not limited to, transmission protocols and/or standards. In some embodiments, network interface 1160 may be communicatively coupled via the network to a network storage resource (not shown). The network coupled to network interface 1160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 1160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 1160 and/or various components associated therewith may be implemented using hardware, software, or any combination thereof.

As depicted in FIG. 11, processor subsystem 1120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 1120 may interpret and/or execute program instructions and/or process data stored locally (e.g., in memory subsystem 1130). In the same or alternative embodiments, processor subsystem 1120 may interpret and/or execute program instructions and/or process data stored remotely (e.g., in a network storage resource, not shown).

As illustrated in FIG. 11, a memory subsystem 1121 within processor subsystem 1120 may include multiple data caches. A cache controller 1122 within memory subsystem 1121 may include circuitry to manage the contents of one or more caches 1123. For example, cache controller 1122 may include circuitry to determine when and if an individual cache line or a group of cache lines should be evicted from one of the caches in accordance with a policy. In at least some embodiments, cache controller 1122 may also include circuitry to limit the amount of modified (dirty) cached data that would be flushed to persistent memory upon a system power failure or other power loss event, in response to requests and commands, or other events.

In FIG. 11, memory subsystem 1130 may comprise a system, device, or apparatus operable to retain and/or retrieve program instructions and/or data for a period of time (e.g., computer-readable media). Memory subsystem 1130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 1100, is powered down. Local storage resource 1150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Each of the processes, methods and algorithms described herein may be embodied in, and fully or partially automated by, code modules executed by one or more computers or computer processors as depicted in FIG. 11. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. For purposes of the claims, the phrase "computer storage medium," "computer-readable storage medium," and variations thereof, does not include waves, signals, and/or other transitory and/or intangible communication media, per se.

In computing environment 1100, I/O subsystem 1140 may comprise a system, device, or apparatus generally operable to receive and/or transmit data to/from/within computing environment 1100. I/O subsystem 1140 may represent, for example, a variety of communication interfaces, graphics interfaces, video interfaces, user input interfaces, and/or peripheral interfaces. As shown, I/O subsystem 1140 may further communicate with various I/O devices such as a touch panel and display adapter.

As illustrated in FIG. 11, computing environment 1100 may include one or more power control modules 1170 and one or more power supply units (PSUs) 1180. In at least some embodiments, power control modules 1170 may include power distribution circuitry. In at least some embodiments, power control module(s) 1170 may control the allocation of power generated by one or more of the power supply units (PSUs) 1180 to other resources in computing environment 1100. In some embodiments, one or more of the power control modules 1170 may include a management controller (MC).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1: A computer-implemented method for performing a storage operation in a virtual computing network with virtualized computing and storage resources, the method comprising:
retrieving a set of write logs from a ring buffer;
merging the set of write logs to a form set of requests, wherein a number of the set of requests is less than or equal to a number of the set of write logs;
in response to determining that the set of requests includes a write operation that overlaps in a logical address range with a previously suspended or ongoing write request, suspending the set of requests;
merging suspended requests to generate a combined request that includes logical address ranges of the suspended requests; and
in response to a new write log being added to the ring buffer or completion of a downstream write request, submitting the combined request for completion.

Clause 2: The computer-implemented method of clause 1, wherein the suspended requests are merged using a skip-list-based data structure.

Clause 3: The computer-implemented method of any of clauses 1-2, wherein the set of write logs are merged using a range sort algorithm to logically sort the set of write logs.

Clause 4: The computer-implemented method of any of clauses 1-3, wherein suspended operations are stored in a de-stage suspended I/O manager (DSM) and active operations are stored in a de-stage ongoing I/O manager (DOM).

Clause 5: The computer-implemented method of any of clauses 1-4, further comprising for ongoing requests:
performing an overlap check;
when it is determined that there is no overlap in address ranges:
inserting an ongoing request to the DOM; and
removing the ongoing request from the DOM when the ongoing request has been completed.

Clause 6: The computer-implemented method of any of clauses 1-5, further comprising for suspended requests:
performing an overlap check;
when it is determined that there is overlap in address ranges:
logically merging the suspended requests and inserting the merged suspended requests into the DSM; and
performing a peek or pop of a previous request in the DSM.

Clause 7: The computer-implemented method of any of clauses 1-6, wherein a buffer is used to process I/O operations as a scatter gather list.

Clause 8: The computer-implemented method of any of clauses 1-7, further comprising storing a write ahead log of a host cache in persistent memory (PMEM) and replicating the write ahead log to secondary nodes.

Clause 9: The computer-implemented method of any of clauses 1-8, wherein the merged suspended requests are flattened onto a shadow table and split into multiple logical objects that do not exceed a threshold.

Clause 10: A computing device comprising:
one or more processors;
a memory in communication with the one or more processors, the memory having computer-readable instructions stored thereupon which, when executed by the one or more processors, cause the computing device perform operations comprising:
retrieving a set of write logs from a ring buffer;
merging the set of write logs to a form set of requests, wherein a number of the set of requests is less than or equal to a number of the set of write logs;
in response to determining that the set of requests includes a write operation that overlaps in a logical address range with a previously suspended or ongoing write request, suspending the set of requests;
merging suspended requests to generate a combined request that includes logical address ranges of the suspended requests; and
in response to a new write log being added to the ring buffer or completion of a downstream write request, submitting the combined request for completion.

Clause 11: The computing device of clause 10, wherein the suspended requests are merged using a skip-list-based data structure.

Clause 12: The computing device of any of 10 and 11, wherein the set of write logs are merged using a range sort algorithm to logically sort the set of write logs.

Clause 13: The computing device of any clauses of 10-12, wherein suspended operations are stored in a de-stage suspended I/O manager (DSM) and active operations are stored in a de-stage ongoing I/O manager (DOM).

Clause 14: The computing device of any clauses of 10-13, further comprising computer-readable instructions stored thereupon which, when executed by the one or more processors, cause the computing device perform operations comprising for ongoing requests:
performing an overlap check;
when it is determined that there is no overlap in address ranges:
inserting an ongoing request to the DOM; and
removing the ongoing request from the DOM when the ongoing request has been completed.

Clause 15: The computing device of any clauses of 10-14, further comprising computer-readable instructions stored thereupon which, when executed by the one or more processors, cause the computing device perform operations comprising for suspended requests:
performing an overlap check;
when it is determined that there is overlap in address ranges:
logically merging the suspended requests and inserting the merged suspended requests into the DSM; and
performing a peek or pop of a previous request in the DSM.

Clause 16: The computing device of any clauses of 10-15, wherein a buffer is used to process I/O operations as a scatter gather list.

Clause 17: The computing device of any clauses of 10-16, further comprising computer-readable instructions stored thereupon which, when executed by the one or more processors, cause the computing device perform operations comprising:
storing a write ahead log of a host cache in persistent memory (PMEM) and replicating the write ahead log to secondary nodes.

Clause 18: The computing device of any clauses of 10-17, wherein the merged suspended requests are flattened onto a shadow table and split into multiple logical objects that do not exceed a threshold.

Clause 19: A computer-implemented method for performing a memory operation in a virtual computing network with virtualized computing and storage resources, the method comprising:

retrieving a first request from a ring buffer configured to store requests for write operations to be executed in the virtual computing network;

determining that the first request comprises a write operation that overlaps in a logical address range with a previously suspended request or an ongoing request;

suspending the first request;

merging the first request and the previously suspended request or ongoing request to generate a single request that includes logical address ranges of the first request and the previously suspended request or ongoing requests; and in response to a new request being added to the ring buffer or completion of a previous request by a storage system of the virtualized computing and storage resources, submitting the single request to the storage system to execute the single request.

Clause 20: The computer-implemented method of clause 19, wherein suspended requests are merged using a skip-list-based data structure.

The disclosure presented herein also encompasses the subject matter set forth in the following additional clauses:

Clause 1: A computer-implemented method for performing a memory operation in a virtual computing network with virtualized computing and storage resources, the method comprising:

receiving requests for write storage operations to be executed in the virtual computing network, the write storage operations executed using polling threads and cache de-stage threads;

storing the requests in a ring buffer;

creating dispatchers and worker threads for executing the polling threads and cache de-stage threads;

generating queue pairs for each pair of dispatchers and worker threads, wherein the queue pairs comprise a submission queue and a completion queue;

retrieving a next available one of the requests from the ring buffer;

using a scoring algorithm to load balance the queue pairs associated with the worker threads, the scoring algorithm operable to determine a score based a current depth of the submission queue and completion queue; and sending the next available request to a worker thread selected based on the score.

Clause 2: The computer-implemented method of clause 1, wherein the scoring algorithm includes a guard line determined based on queue depth (QD) and a baseline value.

Clause 3: The computer-implemented method of any of clauses 1-2, wherein each queue for each worker thread is filled to the baseline value before distributing I/O requests.

Clause 4: The computer-implemented method of any of clauses 1-3, further comprising storing the sent request in a min-heap data structure based on a load balance score.

Clause 5: The computer-implemented method of any of clauses 1-4, further comprising calculating a load balance score of the min-heap data structure based on a guard line.

Clause 6: The computer-implemented method of any of clauses 1-5, wherein the scoring algorithm determines a score as the QD subtracted from the guard line when the QD is less than the guard line.

Clause 7: The computer-implemented method of any of clauses 1-6, wherein the scoring algorithm determines the score as the QD when the QD is equal to or greater than the guard line.

Clause 8: A computing device comprising:

one or more processors;

a memory in communication with the one or more processors, the memory having computer-readable instructions stored thereupon which, when executed by the one or more processors, cause the computing device perform operations comprising:

receiving requests for write storage operations to be executed in a virtual computing network with virtualized computing and storage resources, the write storage operations executed using polling threads and cache de-stage threads;

storing the requests in a ring buffer;

creating dispatchers and worker threads for executing the polling threads and cache de-stage threads;

generating queue pairs for each pair of dispatchers and worker threads, wherein the queue pairs comprise a submission queue and a completion queue;

retrieving a next available one of the requests from the ring buffer;

using a scoring algorithm to load balance the queue pairs associated with the worker threads, the scoring algorithm operable to determine a score based a current depth of the submission queue and completion queue; and sending the next available request to a worker thread selected based on the score.

Clause 9: The computing device of clause 8, wherein the scoring algorithm includes a guard line determined based on queue depth (QD) and a baseline value.

Clause 10: The computing device of any of clauses 8 and 9, wherein each queue for each worker thread is filled to the baseline value before distributing I/O requests.

Clause 11: The computing device of any of clauses 8-10, further comprising computer-readable instructions stored thereupon which, when executed by the one or more processors, cause the computing device perform operations comprising:

storing the sent request in a min-heap data structure based on a load balance score.

Clause 12: The computing device of any of clauses 8-11, further comprising computer-readable instructions stored thereupon which, when executed by the one or more processors, cause the computing device perform operations comprising:

calculating a load balance score of the min-heap data structure based on a guard line.

Clause 13: The computing device of any clauses of 8-12, wherein the scoring algorithm determines a score as the QD subtracted from the guard line when the QD is less than the guard line.

Clause 14: The computing device of any clauses of 8-13, wherein the scoring algorithm determines the score as the QD when the QD is equal to or greater than the guard line.

Clause 15: A computer-readable storage medium having encoded thereon computer-readable instructions that when executed by a system, cause the system to perform operations comprising:

receiving requests for write storage operations to be executed in a virtual computing network with virtualized computing and storage resources, the write storage operations executed using polling threads and cache de-stage threads;

storing the requests in a ring buffer;
creating dispatchers and worker threads for executing the polling threads and cache de-stage threads;
generating queue pairs for each pair of dispatchers and worker threads, wherein the queue pairs comprise a submission queue and a completion queue;
retrieving a next available one of the requests from the ring buffer;
using a scoring algorithm to load balance the queue pairs associated with the worker threads, the scoring algorithm operable to determine a score based a current depth of the submission queue and completion queue; and
sending the next available request to a worker thread selected based on the score.

Clause 16: The computer-readable storage medium of clause 15, wherein the scoring algorithm includes a guard line determined based on queue depth (QD) and a baseline value.

Clause 17: The computer-readable storage medium of any of clauses 15 and 16, wherein each queue for each worker thread is filled to the baseline value before distributing I/O requests.

Clause 18: The computer-readable storage medium of any of clauses 15-17, further comprising storing the sent request in a min-heap data structure based on a load balance score.

Clause 19: The computer-readable storage medium of any of clauses 15-18, further comprising calculating a load balance score of the min-heap data structure based on a guard line.

Clause 20: The computer-readable storage medium of any of clauses 15-19, wherein the scoring algorithm determines a score as a QD subtracted from the guard line when the QD is less than the guard line.

What is claimed is:

1. A computer-implemented method for performing a storage operation in a virtual computing network with virtualized computing and storage resources, the method comprising:
retrieving a set of write logs from a ring buffer;
merging the set of write logs to a form set of requests, wherein a number of the set of requests is less than or equal to a number of the set of write logs;
in response to determining that the set of requests includes a write operation that overlaps in a logical address range with a previously suspended or ongoing write request, suspending the set of requests;
merging suspended requests to generate a combined request that includes logical address ranges of the suspended requests; and
in response to a new write log being added to the ring buffer or completion of a downstream write request, submitting the combined request for completion.

2. The computer-implemented method of claim 1, wherein the suspended requests are merged using a skip-list-based data structure.

3. The computer-implemented method of claim 1, wherein the set of write logs are merged using a range sort algorithm to logically sort the set of write logs.

4. The computer-implemented method of claim 1, wherein suspended operations are stored in a de-stage suspended I/O manager (DSM) and active operations are stored in a de-stage ongoing I/O manager (DOM).

5. The computer-implemented method of claim 4, further comprising for ongoing requests:
performing an overlap check;
when it is determined that there is no overlap in address ranges:
inserting an ongoing request to the DOM; and
removing the ongoing request from the DOM when the ongoing request has been completed.

6. The computer-implemented method of claim 4, further comprising for suspended requests:
performing an overlap check;
when it is determined that there is overlap in address ranges:
logically merging the suspended requests and inserting the merged suspended requests into the DSM; and
performing a peek or pop of a previous request in the DSM.

7. The computer-implemented method of claim 3, wherein a buffer is used to process I/O operations as a scatter gather list.

8. The computer-implemented method of claim 1, further comprising storing a write ahead log of a host cache in persistent memory (PMEM) and replicating the write ahead log to secondary nodes.

9. The computer-implemented method of claim 8, wherein the merged suspended requests are flattened onto a shadow table and split into multiple logical objects that do not exceed a threshold.

10. A computing device comprising:
one or more processors;
a memory in communication with the one or more processors, the memory having computer-readable instructions stored thereupon which, when executed by the one or more processors, cause the computing device perform operations comprising:
retrieving a set of write logs from a ring buffer;
merging the set of write logs to a form set of requests, wherein a number of the set of requests is less than or equal to a number of the set of write logs;
in response to determining that the set of requests includes a write operation that overlaps in a logical address range with a previously suspended or ongoing write request, suspending the set of requests;
merging suspended requests to generate a combined request that includes logical address ranges of the suspended requests; and
in response to a new write log being added to the ring buffer or completion of a downstream write request, submitting the combined request for completion.

11. The computing device of claim 10, wherein the suspended requests are merged using a skip-list-based data structure.

12. The computing device of claim 10, wherein the set of write logs are merged using a range sort algorithm to logically sort the set of write logs.

13. The computing device of claim 10, wherein suspended operations are stored in a de-stage suspended I/O manager (DSM) and active operations are stored in a de-stage ongoing I/O manager (DOM).

14. The computing device of claim 13, further comprising computer-readable instructions stored thereupon which, when executed by the one or more processors, cause the computing device to perform operations comprising for ongoing requests:
performing an overlap check;
when it is determined that there is no overlap in address ranges:
inserting an ongoing request to the DOM; and
removing the ongoing request from the DOM when the ongoing request has been completed.

15. The computing device of claim 13, further comprising computer-readable instructions stored thereupon which, when executed by the one or more processors, cause computing device to perform operations comprising for suspended requests:

performing an overlap check;
when it is determined that there is overlap in address ranges:
logically merging the suspended requests and inserting the merged suspended requests into the DSM; and
performing a peek or pop of a previous request in the DSM.

16. The computing device of claim 12, wherein a buffer is used to process I/O operations as a scatter gather list.

17. The computing device of claim 10, further comprising computer-readable instructions stored thereupon which, when executed by the one or more processors, cause the computing device to perform operations comprising:

storing a write ahead log of a host cache in persistent memory (PMEM) and replicating the write ahead log to secondary nodes.

18. The computing device of claim 17, wherein the merged suspended requests are flattened onto a shadow table and split into multiple logical objects that do not exceed a threshold.

19. A computer-implemented method for performing a memory operation in a virtual computing network with virtualized computing and storage resources, the method comprising:

retrieving a first request from a ring buffer configured to store requests for write operations to be executed in the virtual computing network;
determining that the first request comprises a write operation that overlaps in a logical address range with a previously suspended request or an ongoing request;
suspending the first request;
merging the first request and the previously suspended request or ongoing request to generate a single request that includes logical address ranges of the first request and the previously suspended request or ongoing requests; and
in response to a new request being added to the ring buffer or completion of a previous request by a storage system of the virtualized computing and storage resources, submitting the single request to the storage system to execute the single request.

20. The method of claim 19, wherein suspended requests are merged using a skip-list-based data structure.

* * * * *